United States Patent
Giesker et al.

(10) Patent No.: US 9,896,558 B2
(45) Date of Patent: Feb. 20, 2018

(54) HFO/WATER-BLOWN RIGID FOAM SYSTEMS

(75) Inventors: Christiane Giesker, Osnabrück (DE); Markus Schutte, Osnabrück (DE); Patrick Lax, Lemförde (DE); Jörg Krogmann, Lohne (DE)

(73) Assignee: BASF SE, Ludwigshafen (DE)

( * ) Notice: Subject to any disclaimer, the term of this patent is extended or adjusted under 35 U.S.C. 154(b) by 1054 days.

(21) Appl. No.: 13/561,196

(22) Filed: Jul. 30, 2012

(65) Prior Publication Data

US 2013/0197115 A1    Aug. 1, 2013

Related U.S. Application Data

(60) Provisional application No. 61/513,685, filed on Aug. 1, 2011.

(51) Int. Cl.
*C08J 9/12* (2006.01)
*C08J 9/14* (2006.01)

(52) U.S. Cl.
CPC .............. *C08J 9/127* (2013.01); *C08J 9/146* (2013.01); *C08J 2203/162* (2013.01); *C08J 2205/10* (2013.01); *C08J 2375/04* (2013.01)

(58) Field of Classification Search
CPC ............ C08J 2203/162; C08J 2203/184; C08J 2205/10; C08J 2375/04; C08J 9/08; C08J 9/127; C08J 9/146
See application file for complete search history.

(56) References Cited

U.S. PATENT DOCUMENTS

| | | | | |
|---|---|---|---|---|
| 5,451,615 | A * | 9/1995 | Birch | C08G 18/36 521/130 |
| 5,539,008 | A * | 7/1996 | Dams et al. | 521/131 |
| 5,849,807 | A * | 12/1998 | Doerge | 521/131 |
| 2008/0125505 | A1 | 5/2008 | Bowman et al. | |
| 2008/0125506 | A1 | 5/2008 | Bowman et al. | |
| 2008/0207788 | A1 | 8/2008 | Bowman et al. | |
| 2009/0099273 | A1 | 4/2009 | Williams et al. | |
| 2009/0253820 | A1 * | 10/2009 | Bowman | C08J 9/127 521/170 |
| 2010/0216904 | A1 | 8/2010 | Loh et al. | |
| 2010/0280141 | A1 | 11/2010 | Loh et al. | |
| 2011/0124756 | A1 * | 5/2011 | Singh | C08G 18/1808 521/131 |
| 2011/0152392 | A1 * | 6/2011 | Van Der Puy | C08G 18/1875 521/87 |
| 2011/0218259 | A1 | 9/2011 | Eling et al. | |
| 2011/0218262 | A1 | 9/2011 | Eling et al. | |
| 2011/0263736 | A1 * | 10/2011 | Kosters et al. | 521/106 |
| 2011/0263737 | A1 | 10/2011 | Fricke et al. | |
| 2012/0232180 | A1 | 9/2012 | Kunst et al. | |
| 2012/0259030 | A1 | 10/2012 | Kunst et al. | |
| 2014/0234613 | A1 * | 8/2014 | Nefzger | C08G 18/4895 428/319.1 |

FOREIGN PATENT DOCUMENTS

| WO | WO 2007/002703 A2 | 1/2007 |
|---|---|---|
| WO | WO 2007/053670 A2 | 5/2007 |
| WO | WO 2008/121779 A1 | 10/2008 |
| WO | WO 2008/121790 A1 | 10/2008 |
| WO | WO 2009/067720 A2 | 5/2009 |
| WO | WO 2009/073487 A1 | 6/2009 |
| WO | WO 2009/089400 A1 | 7/2009 |
| WO | WO 2011/039082 A1 | 4/2011 |

OTHER PUBLICATIONS

International Search Report and Written Opinion of the International Searching Authority dated Dec. 5, 2012, in PCT/EP2012/064847.

* cited by examiner

*Primary Examiner* — John Cooney
(74) *Attorney, Agent, or Firm* — Oblon, McClelland, Maier & Neustadt, L.L.P.

(57) ABSTRACT

The present invention relates to a process for producing rigid polyurethane foams by reaction of a) at least one organic polyisocyanate with b) at least one polyol component in the presence of a blowing agent mixture comprising water and halogenated alkenes, wherein the amount of water is at least 1.40 mol/kg of polyol component b) and the amount of halogenated alkene is at most 2.00 mol/kg of polyol component b), and also to the use of such a blowing agent mixture for producing corresponding rigid polyurethane foams and for increasing the adherence and reducing the thermal conductivity of corresponding rigid polyurethane foams. The present invention further relates to a rigid polyurethane foam obtainable by the process of the present invention.

10 Claims, No Drawings

HFO/WATER-BLOWN RIGID FOAM SYSTEMS

CROSS-REFERENCE TO RELATED APPLICATION

This application is based upon and claims the benefit of priority to U.S. Provisional Application No. 61/513,685, which was filed on Aug. 1, 2011.

The present invention relates to a process for producing rigid polyurethane foams by reaction of a) at least one organic polyisocyanate with b) at least one polyol component in the presence of a blowing agent mixture comprising water and halogenated alkenes, wherein the amount of water is at least 1.40 mol/kg of polyol component b) and the amount of halogenated alkene is at most 2.00 mol/kg of polyol component b), and also to the use of such a blowing agent mixture for producing corresponding rigid polyurethane foams and for increasing the adherence and reducing the thermal conductivity of corresponding rigid polyurethane foams. The present invention further relates to a rigid polyurethane foam obtainable by the process of the present invention.

Rigid polyurethane foams have various possible uses and have long been used, inter alia, to provide thermal insulation to refrigerators for example. To optimize the thermal conductivity of foams, refrigerator applications as well as water additionally utilize HCFC-141b (1,1,1-dichlorofluoroethane) or HFC-365mfc (1,1,1,3,3-pentafluorobutane)/HFC-227ea (1,1,1,2,3,3,3-heptafluoropropane) or cyclopentane or HFC-245fa (1,1,1,3,3-pentafluoropropane) as physical blowing agents. Yet both types of systems also have disadvantages. Cyclopentane systems have increased safety requirements in the manufacturing facility because of the flammability of the blowing agent. 245fa-based systems have the disadvantage of high costs for the blowing agent and of a comparatively high global warming potential (GWP). In order to achieve a sufficient effect with regard to lowering the thermal conductivity, the molar fraction of physical blowing agent in such systems is typically higher than the carbon dioxide produced by the isocyanate-water reaction. Therefore, 245fa-based systems having high proportions of 245fa cannot be supplied as components ready admixed with the polyol blend, instead the blowing agent has to be added on site via appropriate metered-addition facilities for the blowing agent.

In addition, purely water-blown systems have now also become commercially established in certain applications where energy efficiency is also significantly affected by factors other than the thermal conductivity of the rigid foam. Purely water-blown systems do have higher thermal conductivity and a higher density for the foam, but they are relatively easy to process in a manufacturing facility. And they require no additional technical measures for handling flammable liquids or metering facilities for the blowing agent.

The use of fluorinated alkenes known as hydrofluoroolefins (HFOs), which may optionally also comprise further halogen atoms such as chlorine, so-called hydrochlorofluoroolefins (HCFOs), or bromine, as blowing agents is known in principle. Examples of industrially relevant HFOs/HCFOs are 1,1,1,4,4,4-hexafluoro-2-butene (HFO-1336mzz) having a boiling point of about 32° C. or 1-chloro-3,3,3-trifluoro-1-propene (HCFO-1233zd) having a boiling point of about 19° C. Similarly, the use of HFOs/HCFOs in rigid foam systems has been described, especially with the focus on good thermal conductivity coupled with low GWP. However, the blowing agent is used therein at very high levels, similar to those of current 245fa systems.

Processes for producing polyurethane foams are already known from the prior art:

US 2008/125505 and US 2008/125506 describe the use of fluorine-containing olefins as blowing agents for foams. WO 2008/121790 describes mixtures of hydrofluoroolefins (HFOs) and hydrochlorofluoroolefins (HCFOs) as blowing agents for producing foams. WO 2008/121779 describes a blowing agent composition comprising at least one hydrochloroolefin.

WO 2007/053670 describes foam production blowing agents comprising unsaturated hydrofluorocarbons. Bromofluoroolefins are mentioned as well. The WO 2009/073487 and WO 2009/089400 applications describe cis-1,1,1,4,4,4-hexafluoro-2-butene and 2-chloro-3,3,3-trifluoropropene, respectively, as blowing agents in the production of polyurethane and polyisocyanurate foams.

WO 2007/002703, US 2008/207788 and WO 2009/067720 describe HFO-1234ze and HCFO-1233zd and/or mixtures comprising these substances together with fluorine-containing ethers, in various applications including the use as blowing agents for PU foams.

Significant requirements of rigid polyurethane foams are a low thermal conductivity, a good flowability, an adequate adherence of foam to outer layers and good mechanical properties. Especially in the case of rigid polyurethane foams produced using water as a blowing agent, the foams frequently have inadequate adherence.

The problem addressed by the present invention in view of the known prior art is therefore that of providing a process for producing polyurethane foams which provides polyurethane foams offering low thermal conductivity, adequate adherence of foam to outer layers and good mechanical properties.

It has now been found that, surprisingly, rigid polyurethane foams produced using water as sole or predominant blowing agent do have an improved adherence when a halogenated alkene is additionally used as blowing agent, and the water and the halogenated alkene are present in very specific amounts in respect of the polyol component used.

The present invention accordingly provides a process for producing rigid polyurethane foams by reaction of
a) at least one organic polyisocyanate with
b) at least one polyol component
in the presence of a blowing agent mixture comprising water and halogenated alkenes, wherein the amount of water is at least 1.40 mol/kg of polyol component b) and the amount of halogenated alkene is at most 2.00 mol/kg of polyol component b).

The process of the present invention will now be described in detail.

The organic polyisocyanates a) can be any organic di- and polyisocyanates known to a person skilled in the art, preferably aromatic polyfunctional isocyanates.

Specific examples are 2,4- and 2,6-tolylene diisocyanate (TDI) and the corresponding isomeric mixtures, 4,4'-, 2,4'- and 2,2'-diphenylmethane diisocyanate (MDI) and the corresponding isomeric mixtures, mixtures of 4,4'- and 2,4'-diphenylmethane diisocyanates, polyphenyl polymethylene polyisocyanates, mixtures of 4,4'-, 2,4'- and 2,2'-diphenylmethane diisocyanates and polyphenyl polymethylene polyisocyanates (polymer MDI) and mixtures of polymer MDI and tolylene diisocyanates. The organic di- and polyisocyanates can be used individually or in the form of mixtures.

So-called modified polyfunctional isocyanates, i.e., products obtained by chemical conversion of organic di- and/or polyisocyanates, are frequently also used. Examples include di- and/or polyisocyanates comprising uretdione, carbamate, isocyanurate, carbodiimide, allophanate and/or urethane groups. Modified polyisocyanates may optionally be mixed with each or one another or with unmodified organic polyisocyanates such as, for example, 2,4'-diphenylmethane diisocyanate, 4,4'-diphenylmethane diisocyanate, polymer MDI, 2,4- and/or 2,6-tolylene diisocyanate.

It is also possible to use reaction products of polyfunctional isocyanates with polyhydric polyols, and also mixtures thereof with other di- and polyisocyanates.

A particularly advantageous organic polyisocyanate is polymer MDI, especially with an NCO content of 29% to 34% by weight and a 25° C. viscosity in the range from 100 to 1000 mPa·s.

The at least one polyol component b) can be any polyol component comprising at least two reactive groups, preferably OH groups, especially polyether alcohols and/or polyester alcohols having OH numbers in the range from 25 to 800 mg KOH/g.

The optionally used polyester alcohols are usually prepared by condensation of polyfunctional alcohols, preferably diols, having 2 to 12 carbon atoms and preferably 2 to 6 carbon atoms with polyfunctional carboxylic acids having 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

The optionally used polyester alcohols usually have a functionality in the range from 1.5 to 4.

In one preferable embodiment, the at least one polyol component b) comprises by way of component bi) at least one vegetable oil, for example at least one fatty acid selected from the group consisting of castor oil, oleic acid and mixtures thereof. In a further embodiment, component bi) is exclusively or additionally at least one polyether alcohol or at least one polyester alcohol.

Castor oil bi) is preferably used in an amount of 1-20% by weight, based on the weight of polyol component b).

Castor oil may also be chemically modified castor oil, especially as a result of an addition reaction with alkylene oxides. However, it is preferable to use unmodified castor oil.

Polyol component b) comprises more particularly polyether alcohols prepared by known processes, for example by anionic polymerization of alkylene oxides on H-functional starter substances in the presence of catalysts, preferably alkali metal hydroxides or double metal cyanide (DMC) catalysts.

The alkylene oxides used are usually ethylene oxide or propylene oxide, but also tetrahydrofuran, various butylene oxides, styrene oxide, preferably straight 1,2-propylene oxide. The alkylene oxides can be used individually, alternatingly in succession or as mixtures.

The starter substances used are more particularly compounds having at least 2 and preferably from 2 to 8 hydroxyl groups or having at least two primary amino groups in the molecule.

By way of starter substances having at least 2 and preferably from 2 to 8 hydroxyl groups in the molecule it is preferable to use trimethylolpropane, glycerol, pentaerythritol, sugar compounds such as for example glucose, sorbitol, mannitol and sucrose, polyhydric phenols, resoles, for example oligomeric condensation products formed from phenol and formaldehyde and Mannich condensates formed from phenols, formaldehyde and dialkanolamines, and also melamine.

By way of starter substances having at least two primary amino groups in the molecule it is preferable to use aromatic di- and/or polyamines, for example phenylenediamines, and 4,4'-, 2,4'- and 2,2'-diaminodiphenylmethane and also aliphatic di- and polyamines, such as ethylenediamine.

The polyether alcohols have a functionality of preferably 2 to 8 and hydroxyl numbers of preferably 25 mg KOH/g to 800 mg KOH/g and especially 150 mg KOH/g to 570 mg KOH/g.

In a preferable embodiment of the process according to the present invention, the polyol component b) comprises at least one polyether alcohol bii) having a hydroxyl number in the range between 350 and 600 and a functionality in the range between 3.5 and 5.5.

The polyether alcohol bii) is preferably prepared by addition of ethylene oxide and/or propylene oxide, preferably propylene oxide, onto H-functional starter substances. The starter substances used are preferably the above-recited sugars, especially sucrose or sorbitol. Typically, the sugars are reacted with the alkylene oxides in the presence of so-called co-starters, usually room temperature liquid 2- or 3-functional alcohols, such as glycerol, trimethylolpropane, ethylene glycol, propylene glycol, or water. Catalysts used are typically basic compounds, preferably potassium hydroxide, or amines.

The polyether alcohol bii) is preferably used in an amount of 30-55% by weight, based on the weight of polyol component b). Particularly good adherence is obtained in this range, and foam brittleness may also be reduced therein.

In a further preferable embodiment, the component b) comprises at least one polyether alcohol biii). This is a 2- to 3-functional polyether alcohol having a hydroxyl number in the range between 150 and 450 mg KOH/g.

Glycerol and/or trimethylolpropane are/is preferably used as starter substances and ethylene oxide and/or propylene oxide, especially propylene oxide, as alkylene oxide. Component biii) is preferably used in an amount of 2-55% by weight, based on the weight of polyol component b).

In a preferable version, the polyether alcohol biii) is a 3-functional polyether alcohol having a hydroxyl number in the range between 150 and 420 mg KOH/g.

A further preferable embodiment of the process according to the present invention utilizes at least one polyether alcohol biiia) and at least one polyether alcohol biiib) as component biii).

Polyether alcohol biiia) is a three-functional, preferably trimethylolpropane-started polyether alcohol having a hydroxyl number in the range between 150 and 200 mg KOH/g.

Polyether alcohol biiib) is a three-functional, preferably glycerol-started polyether alcohol having a hydroxyl number in the range between 350 and 420 mg KOH/g.

Using the polyether alcohols biii) can improve the phase stability of the polyol component.

In addition, further compounds having at least two isocyanate-reactive hydrogen atoms can also be used in polyol component b), examples being chain extenders and/or crosslinkers. To modify the mechanical properties, the addition of difunctional chain-extending agents, tri- and higher-functional crosslinking agents or optionally also mixtures thereof may prove to be advantageous. By way of chain-extending and/or crosslinking agents it is preferable to use alkanolamines and especially diols and/or triols having molecular weights less than 400, preferably 60 to 300.

Chain-extending agents, crosslinking agents or mixtures thereof are advantageously used in an amount of 1% to 20% by weight and preferably in the range from 2% to 5% by weight, based on polyol component b).

The process according to the present invention is carried out in the presence of a blowing agent mixture comprising water and halogenated alkenes wherein the amount of water is at least 1.40 mol/kg of polyol component b) and the amount of halogenated alkene is at most 2.00 mol/kg of polyol component b).

In one embodiment of the present invention, the process according to the present invention is carried out in the presence of a blowing agent mixture comprising water and halogenated alkenes wherein the amount of water is at least 1.30 mol/kg of polyol component b) and the amount of halogenated alkene is at most 2.00 mol/kg of polyol component b).

In a preferable embodiment, the amount of water is at least 1.80 mol/kg of polyol component b), and more preferably at least 2.00 mol/kg of polyol component b). The amount of water according to the present invention is preferably at most 5.00 mol/kg of polyol component b).

In a preferable embodiment, the amount of halogenated alkene is at most 1.50 mol/kg of polyol component b), more preferably at most 1.20 mol/kg of polyol component b) and even more preferably at most 0.55 mol/kg of polyol component b). The amount of halogenated alkene according to the present invention is preferably at least 0.10 mol/kg of polyol component b).

The process of the present invention is therefore preferably carried out in the presence of a blowing agent mixture comprising water and halogenated alkenes wherein the amount of water is at least 1.80 mol/kg of polyol component b) and the amount of halogenated alkene is at most 1.50 mol/kg of polyol component b) and more preferably 1.20 mol/kg of polyol component b).

The process of the present invention is more preferably carried out in the presence of a blowing agent mixture comprising water and halogenated alkenes wherein the amount of water is at least 2.00 mol/kg of polyol component b) and the amount of halogenated alkene is at most 0.55 mol/kg of polyol component b).

Water is known per se to a person skilled in the art. Tap water, distilled water and/or demineralized water can be used according to the present invention.

In general, all halogenated, preferably fluorinated, alkenes known to a person skilled in the art can be used as blowing agents, according to the present invention.

According to the present invention, the use of C2 to C6 fluoroalkenes is preferable and of C3 to C5 fluoroalkenes is particularly preferable.

Particularly preferable examples of fluorinated alkenes that are suitable according to the present invention are propenes, butenes, pentenes and hexenes having 3 to 6 fluorine substituents, while other substituents such as chlorine can be present, examples being tetrafluoropropenes, fluorochloropropenes, for example trifluoromonochloropropenes, pentafluoropropenes, fluorochlorobutenes, hexafluorobutenes or mixtures thereof.

Fluorinated alkenes that are particularly preferable according to the present invention are selected from the group consisting of cis-1,1,1,3-tetrafluoropropene, trans-1,1,1,3-tetrafluoropropene, 1,1,1-trifluoro-2-chloropropene, 1-chloro-3,3,3-trifluoropropene, 1,1,1,2,3-pentafluoropropene, in cis or trans form, 1,1,1,4,4,4-hexafluorobutene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene, 1,1,1-trifluoro-2-butene and mixtures thereof.

It is very particularly preferable according to the present invention to use 1-chloro-3,3,3-trifluoropropene or 1,1,1,4,4,4-hexafluorobutene, or a mixture thereof, as blowing agent in addition to water in the abovementioned amounts.

In a preferable embodiment of the process according to the present invention, the polyol component b) comprises a further additive selected from the group consisting of alkylene carbonates, carbonamides, pyrrolidones, catalysts, auxiliaries, additives and mixtures thereof.

Suitable alkylene carbonates are preferably ethylene carbonate and/or propylene carbonate, more preferably propylene carbonate.

Suitable carbonamides are preferably urea and/or alkylureas. Alkylureas are particularly tetramethylurea and diisobutylurea.

1-Methyl-2-pyrrolidone is a particularly suitable pyrrolidone.

Alkylene carbonates, carbonamides and/or pyrrolidones are used for example in an amount of 0% to 15% by weight and preferably 1.5-15% by weight, all based on the weight of polyol component b). The components mentioned can be used individually or in any desired mixtures with each or one another. The use of propylene carbonate is preferable.

Catalysts used are more particularly compounds that have a substantial speeding effect on the reaction of isocyanate groups with isocyanate-reactive groups. Examples of such catalysts are basic amines, such as secondary aliphatic amines, imidazoles, amidines, alkanolamines, Lewis acids or organometallic compounds, especially those based on tin. Catalyst systems consisting of a mixture of various catalysts can also be used.

When isocyanurate groups are to be incorporated in the rigid polyurethane foam, specialty catalysts are preferred. Examples of isocyanurate catalysts used are the abovementioned amines or metal carboxylates, especially potassium acetate and its solutions. The catalysts can be used alone or in any desired mixtures with each or one another, as required.

Useful auxiliaries and/or added substances include the materials known per se for this purpose, examples being surface-active substances, foam stabilizers, cell regulators, fillers, pigments, dyes, antioxidants, flame retardants, hydrolysis control agents, antistats, fungistats and bacteriostats.

According to the present invention, the amounts of components present in polyol component b) generally sum to 100% by weight.

Further particulars concerning the starting materials, blowing agents, catalysts and also assistant and/or added substances used for the purpose of practicing the process of the present invention appear for example in Kunststoffhandbuch, $2^{nd}$ edition: chapter 3 (raw materials), pages 42-111 and section 6.1 (PU rigid foams: chemistry and raw materials), pages 247-249.

To produce the isocyanate-based rigid foams, the polyisocyanates and the polyol component b) are reacted in such amounts that the isocyanate index lies in the range between 100 and 220 and preferably between 110 and 180 in the case of polyurethane foams.

It will prove particularly advantageous to operate a two-component process and to combine the at least one polyol component b) with the blowing agents of the present invention and optionally foam stabilizers and flame retardants and also the catalysts and assistant and/or addition materials into a so-called polyol component and to react the latter with the at least one organic polyisocyanate or the mixtures and optionally blowing agents.

The process of the present invention improves the adherence of predominantly water-blown rigid polyurethane foams. Further improvements are achieved in respect of the mechanical properties of the foams and also the phase stability of the polyol component.

The present invention also provides for the use of a blowing agent mixture comprising water and halogenated alkenes for producing rigid polyurethane foams from at least one organic polyisocyanate a) and at least one polyol component b), wherein the amount of water is at least 1.40 mol/kg of polyol component b) and the amount of halogenated alkene is at most 2.00 mol/kg of polyol component b).

In one embodiment, the present invention also provides for the use of a blowing agent mixture comprising water and halogenated alkenes for producing rigid polyurethane foams from at least one organic polyisocyanate a) and at least one polyol component b), wherein the amount of water is at least 1.30 mol/kg of polyol component b) and the amount of halogenated alkene is at most 2.00 mol/kg of polyol component b).

The present invention also provides for the use of a blowing agent mixture comprising water and halogenated alkenes for increasing the adherence and reducing the thermal conductivity of rigid polyurethane foams formed from at least one organic polyisocyanate a) and at least one polyol component b), wherein the amount of water is at least 1.40 mol/kg of polyol component b) and the amount of halogenated alkene is at most 2.00 mol/kg of polyol component b).

In one embodiment, the present invention also provides for the use of a blowing agent mixture comprising water and halogenated alkenes for increasing the adherence and reducing the thermal conductivity of rigid polyurethane foams formed from at least one organic polyisocyanate a) and at least one polyol component b), wherein the amount of water is at least 1.30 mol/kg of polyol component b) and the amount of halogenated alkene is at most 2.00 mol/kg of polyol component b).

The present invention also provides a rigid polyurethane foam obtainable by the process of the present invention.

The use according to the present invention and the rigid polyurethane foam according to the present invention are subject mutatis mutandis to the above observations and more particularly the preferred embodiments mentioned apply mutatis mutandis.

EXAMPLES

The examples are intended to illustrate the present invention and not restrict it.
Overview of Methods of Measurement
1. Investigations on Liquid Samples
1.1 Determination of Viscosity:
Polyol viscosity is determined, unless otherwise stated, at 25° C. in accordance with DIN EN ISO 3219 using a Rheotec RC 20 rotary viscometer with a CC 25 DIN spindle (spindle diameter: 12.5 mm; internal diameter of measuring cylinder: 13.56 mm) at a shear rate of 50 Hz.
1.2 Measurement of Hydroxyl Number:
Hydroxyl (OH) numbers are determined to DIN 53240.
2. Investigations on Foam Samples
2.1 Determination of Brittleness of Rigid Foams:
Brittleness is determined qualitatively by pushing down on the foams with the thumb in the edge region. Brittle foams are very quick to deform irreversibly.
2.2 Determination of Compressive Strength:
Compressive strength is determined to DIN 53421/DIN EN ISO 604.
2.3 Thermal Conductivity:
After foaming, a foam cuboid is conditioned in a standard atmosphere for 24 hours. The test specimen is then cut out of the middle of the foam cube (i.e., the top and bottom surfaces are removed) and measures 200×200×30 $mm^3$. Thermal conductivity is then determined at a mean temperature of 23° C. using a Hesto A50 plate-type heat flow meter.
2.4 Dimensional Stability (Autoclave):
One day after a foam cuboid was produced, 18 samples were taken from it at uniform intervals along its length. The test specimens had the approximate dimensions 5×5×4 $cm^3$. Exact volume is determined by immersion in a water bath. The specimens are subsequently dabbed dry and stored in an autoclave at 1 bar overpressure for 10 minutes. The volume of each test specimen is redetermined and the mean value is computed over all relative decreases in volume.
2.5 Adherence Measurements:
Polyurethane foam adherence to metal surfaces is measured on a foam cuboid (500×200×50 $mm^3$) to which the aluminum-coated paper was still adhering. This test specimen is sawn from the lower end of the Brett molding (2000×200×50 $mm^3$). The outer layer of the Brett molding is scored with a knife to a length of 20 cm at a spacing of 6 cm. Adherence is determined 10 minutes after starting the foaming operation (the test specimen was demolded after 7 min) using a tensile tester which pulls the coated paper off via a change-of-direction roller perpendicularly to the molding plane at a pulling speed of 100 mm/min. The tensile apparatus incorporates a force meter which measures the force needed to pull off the foil.
3. Investigations on Hand-Foamed Samples
The polyol components are intensively mixed with the stated amount of isocyanate component in a beaker using a laboratory stirrer (Vollrath stirrer) at a stirrer speed of 1400 revolutions per minute for a stir time of 10 seconds to make it foam up in the beaker. This so-called beaker test is used to determine the cream time, the fiber time, the rise time, foam density and also, where applicable, brittleness.

Further measurements are determined on foamed bodies obtained by pouring the stirred reaction mixture from the beaker into a box mold measuring 160×400×45 $mm^3$. To determine thermal conductivity, the box mold can be enlarged to a width of 200 mm. The mold is lined beforehand with paper coated with aluminum on one side. The foam is applied to the aluminum-coated surface and the mold is then closed. Unless otherwise stated, the mold is heated to 35° C. and the foamed body is demolded after 7 minutes. The original weight is chosen such that the desired foam density—40 to 43 $kg/m^3$, unless otherwise stated—results. Prior to all subsequent measurements other than the adherence measurement, the coated paper is removed.
3.1 Determination of Foam Density (Beaker Test):
Foam density is determined in the beaker test by separating off the foam above the beaker lip and then weighing the beaker together with the remaining foam. This mass minus the mass of the empty beaker (measured before foaming) divided by the volume of the beaker (735 $cm^3$) is the foam density.
4. Investigations on Machine-Foamed Sample Specimens
The stated raw materials are used to prepare a polyol component. A Puromat® PU 30/80 IQ high-pressure machine (Elastogran GmbH) with a discharge rate of 250 g/s is used to mix the polyol component with the particular stated amount of the stated isocyanate. The reaction mixture is introduced into heated molds measuring 2000×200×50 mm³ (Brett) or
700×400×90 mm³ (box)

and left to foam up therein. The mold is lined beforehand with paper coated on one side with aluminum. The foam is applied to the aluminum-coated surface and the mold is then closed.

Unless otherwise stated, the mold is heated to 45° C. and the foamed body is demolded after 7 minutes. Overpacking is 14.5%, unless otherwise stated. Before all subsequent measurements other than the adherence measurement the coated paper is removed.

Determination of Cream and Fiber Times and Also Foam Density:

A PE bag (about 30 cm in diameter) has about 900 g of reaction mixture injected into it. Cream time is defined as the time interval between shot commencement and commencement of volume expansion of the reaction mixture. Fiber time is the time interval between shot commencement and the moment at which fibers can be pulled out of the reaction mixture using a foam strip.

To determine the free rise core density after curing (24 h later) of the foam, five samples of about 60×60×60 mm³ in size are cut out of the middle of the same sample. They are weighed and their volume is determined by immersion in a water bath. These quantities are used to compute their density and the mean value of 5 samples is reported.

Determination of Demolding Behavior:

Demolding behavior is determined by measuring the post-expansion of foamed bodies produced using the box mold as a function of demold time and overpacking (OP=the ratio of overall foam density to minimum fill density). Post-expansion is determined by height measurement of fume cuboids after 24 hours.

Raw Materials Used:

Polyol 1 (Corresponds to Component bii):
   Polyether polyol based on sorbitol and propylene oxide having a hydroxyl number of 490 mg KOH/g, a functionality of 5 and a viscosity of 22750 mPa·s at 25° C.

Polyol 2 (Corresponds to Component biiia):
   Polyether polyol based on trimethylolpropane and propylene oxide having a hydroxyl number of 160 mg KOH/g, a functionality of 3 and a viscosity of 300 mPa·s at 25° C.

Polyol 3 (Corresponds to Component bi):
   Castor oil having a hydroxyl number of 160 mg KOH/g and a viscosity of 1000 mPa·s at 20° C.

Polyol 4 (Corresponds to Component biiib):
   Polyether polyol based on glycerol and propylene oxide having a hydroxyl number of 400 mg KOH/g, a functionality of 3 and a viscosity of 370 mPa·s at 25° C.

Foam stabilizer: Tegostab® B 8496 (Evonik)
Amine catalyst 1: dimethylcyclohexylamine
Amine catalyst 2: Lupragen® N 600 (BASF SE)
Isocyanate: Lupranat® M20 (BASF SE), NCO content 31.8%

The amounts of starting materials and also the results measured are shown in the following tables:

TABLE 1 inventive examples 5, 6, 8, 9 and 10 and comparative examples 1 (V), 2 (V), 3 (V), 4 (V) and 7 (V),

| Example | 1 (V) Ref. | 2 (V) H₂O | 3 (V) 245fa | 4 (V) 365mfc/ 227 ea | 5 1336mzz | 6 1233zd | 7 (V) 245fa | 8 1336mzz | 9 1336mzz | 10 1233zd |
|---|---|---|---|---|---|---|---|---|---|---|
| polyol component: | | | | | | | | | | |
| polyol 1 [kg] | 37.40 | 36.70 | 34.20 | 33.80 | 33.40 | 34.20 | 34.60 | 34.60 | 34.95 | 35.39 |
| polyol 2 [kg] | 36.15 | 35.45 | 32.95 | 32.55 | 32.15 | 32.95 | 33.45 | 33.45 | 33.61 | 34.09 |
| polyol 3 [kg] | 12.35 | 12.00 | 10.75 | 10.55 | 10.35 | 10.75 | 11 | 11 | 10.82 | 11.12 |
| polyol 4 [kg] | 3.00 | 3.00 | 3.00 | 3.00 | 3.00 | 3.00 | 3.00 | 3.00 | 3.14 | 3.10 |
| propylene carbonate [kg] | 5.00 | 5.00 | 5.00 | 5.00 | 5.00 | 5.00 | 5.00 | 5.00 | 5.23 | 5.17 |
| Tegostab B 8496 [kg] | 2.00 | 2.00 | 2.00 | 2.00 | 2.00 | 2.00 | 2.00 | 2.00 | 2.09 | 2.07 |
| amine catalyst 1 [kg] | 1.10 | 1.10 | 1.10 | 1.10 | 1.10 | 1.10 | 1.20 | 1.20 | 1.15 | 1.14 |
| amine catalyst 2 [kg] | 0.40 | 0.40 | 0.40 | 0.40 | 0.40 | 0.40 | 0.40 | 0.40 | 0.42 | 0.41 |
| water [kg] | 2.60 | 4.35 | 2.60 | 2.60 | 2.60 | 2.60 | 4.35 | 4.35 | 3.40 | 3.40 |
| 245fa [kg] | — | — | 8.00 | — | — | — | 5.00 | — | — | — |
| 365mfc/227 ea [kg] | — | — | — | 9.00 | — | — | — | — | — | — |
| 1336mmzz [kg] | — | — | — | — | 10.00 | — | — | 5.00 | 5.20 | — |
| 1233 zd [kg] | — | — | — | — | — | 8.00 | — | — | — | 4.00 |
| total polyol component [kg] | 100.00 | 100.00 | 100.00 | 100.00 | 100.00 | 100.00 | 100.00 | 100.00 | 100.00 | 100.00 |
| n H₂O [mol] | 144.4 | 241.7 | 144.4 | 144.4 | 144.4 | 144.4 | 241.7 | 241.7 | 189.0 | 189.0 |
| n H₂O/ kg of polyol [mol/kg] | 1.44 | 2.42 | 1.44 | 1.44 | 1.44 | 1.44 | 2.42 | 2.42 | 1.89 | 1.89 |
| n phys. blowing agent (HFC or HFO or HCFO) [mol] | — | — | 59.7 | 59.6 | 61.0 | 61.5 | 37.3 | 30.5 | 31.72 | 30.75 |
| n phys. blowing agent/ kg of polyol [mol/kg] | | | 0.6 | 0.6 | 0.6 | 0.6 | 0.37 | 0.30 | 0.32 | 0.31 |
| processing: | | | | | | | | | | |
| gravimetric mixing ratio of polyol:Lupranat M20 | 100:123 | 100:151 | 100:116 | 100:115 | 100:114 | 100:116 | 100:147 | 100:147 | 100:131 | 100:132 |
| index | 117 | 117 | 117 | 117 | 117 | 117 | 117 | 117 | 117 | 117 |
| beaker test: | | | | | | | | | | |
| density [g/l] | 47.8 | 32.9 | 33.8 | 33.6 | 33.6 | 34.2 | — | — | 33.9 | 34.0 |
| brittleness | somewhat | somewhat | not br. | not br. | not br. | not br. | — | — | not br. | not br. |
| mini box: | | | | | | | | | | |

TABLE 1-continued inventive examples 5, 6, 8, 9 and 10 and comparative examples 1 (V), 2 (V), 3 (V), 4 (V) and 7 (V).

| Example | 1 (V) Ref. | 2 (V) H₂O | 3 (V) 245fa | 4 (V) 365mfc/ 227 ea | 5 1336mzz | 6 1233zd | 7 (V) 245fa | 8 1336mzz | 9 1336mzz | 10 1233zd |
|---|---|---|---|---|---|---|---|---|---|---|
| adherence at 35° C. after 10 min [N] | 13.67 | 5.04 | — | — | 10.10 | 8.59 | — | — | 12.5 | 12.1 |
| thermal conductivity after 24 h at 23° C. [mW/m · K] | 23.7 | 22.3 | 21.0 | 21.1 | 20.3 | 21.0 | — | — | n.d. | n.d. |
| brittleness | somewhat | somewhat | not br. | not br. | not br. | not br. | — | — | not br. | not br. |
| machine test: | | | | | | | | | | |
| density [g/l] | — | — | — | — | — | — | 23.3 | 24.0 | — | — |
| dimensional stability vol % autoclave 10 min at 1 bar | — | — | — | — | — | — | 4.46 | 3.95 | — | — |
| adherence at 35° C. after 10 min [N] | — | — | — | — | — | — | 9.38 | 10.40 | — | — |
| adherence at 45° C. after 10 min [N] | — | — | — | — | — | — | 14.32 | 15.06 | — | — |

TABLE 2 further tests according to the invention

| | 1233zd | | | | 1336mzz | | | |
|---|---|---|---|---|---|---|---|---|
| mol of HFO or HCFO/kg of polyol component | 0.1 | 0.3 | 0.6 | 1.2 | 0.1 | 0.3 | 0.6 | 1.2 |
| polyol 1 [pbw] | 36.80 | 35.80 | 34.20 | 31.20 | 36.80 | 35.40 | 33.40 | 29.60 |
| polyol 2 [pbw] | 35.55 | 34.55 | 32.95 | 29.95 | 35.55 | 34.15 | 32.15 | 28.35 |
| polyol 3 [pbw] | 12.05 | 11.55 | 10.75 | 9.25 | 12.05 | 11.35 | 10.35 | 8.45 |
| polyol 4 [pbw] | | | | 3.00 | | | | |
| propylene carbonate [pbw] | | | | 5.00 | | | | |
| Tegostab B 8496 [pbw] | | | | 2.00 | | | | |
| amine catalyst 2 [pbw] | | | | 0.40 | | | | |
| amine catalyst 1 [pbw] | | | | 1.10 | | | | |
| H₂O [pbw] | | | | 2.60 | | | | |
| 1233zd [pbw] | 1.50 | 4.00 | 8.00 | 15.50 | — | — | — | — |
| 1336mzz [pbw] | — | — | — | — | 1.50 | 5.00 | 10.00 | 19.50 |
| mixing ratio of polyol:M20 | 100:121 | 100:119 | 100:116 | 100:110 | 100:121 | 100:119 | 100:114 | 100:106 |
| index | | | | 117 | | | | |
| beaker test: | | | | | | | | |
| density [g/l] | 44.0 | 39.6 | 34.2 | 27.3 | 44.0 | 39.4 | 33.6 | 26.3 |
| brittleness | | | | not brittle | | | | |
| mini box: | | | | | | | | |
| adherence at 35° C. after 10 min [N] | 13.35 | 12.61 | 8.59 | 9.51 | 12.18 | 13.04 | 10.10 | 5.15 |
| thermal conductivity after 24 h at 23° C. [mW/m · K] | 22.7 | 22.0 | 21.0 | 20.4 | 22.9 | 21.5 | 20.3 | 21.5 |
| brittleness | | | | not brittle | | | | |

Key to Tables 1 and 2:
245fa: HFC-245fa (1,1,1,3,3-pentafluoropropane)
365mfc: HFC-365mfc (1,1,1,3,3-pentafluorobutane)
227ea: HFC-227ea (1,1,1,2,3,3,3-heptafluoropropane)
1336mzz: HFO-1336mzz (1,1,1,4,4,4-hexafluoro-2-butene)
1233zd: HCFO-1233zd (1-chloro-3,3,3-trifluoro-1-propene)

SUMMARY OF EXAMPLES

Example 1

Purely water-blown rigid foam of high density: good adherence, but poor (excessive) thermal conductivity, brittle foam, high foam density disadvantageous.

Example 2

Purely water-blown rigid foam of acceptable density: very poor adherence, brittle foam, thermal conductivity better than in example 1.

Examples 3 and 4

Rigid foams blown with water and fluoroalkanes (HFCs) as co-blowing agents: density as in comparative example 2, not brittle, good thermal conductivity.

Examples 5 and 6 (According to the Invention)

Rigid foams blown using water and fluoroalkenes (HFOs) as co-blowing agents: density as in examples 2 to 4, not brittle, distinctly improved adherence than in example 2, good to very good (low) thermal conductivity.

Example 7

Comparatively low-density rigid foam blown using water and fluoroalkane (HFC) as co-blowing agents: machine test with high-pressure mixing head.

Example 8 (According to the Invention)

Comparatively low-density rigid foam blown using water and fluoroalkene (HFO) as co-blowing agents: machine test with high-pressure mixing head, comparable density to example 7, improved dimensional stability and improved adherence compared with example 7.

Examples 9 and 10 (According to the Invention)

Rigid foams as in inventive examples 5 and 6, blown using water and fluoroalkenes (HFOs) as co-blowing agents, but with a higher proportion of HFO: density as in examples 2 to 6, not brittle, improved adherence over examples 2, 5 and 6.

We claim:

1. A process for producing a rigid polyurethane foam, the process comprising reacting at least one organic polyisocyanate with at least one polyol component in the presence of a blowing agent mixture comprising water and at least one halogenated alkene, to form a polyurethane foam, wherein:
    the at least one polyol component comprises at least three polyether alcohols and at least one of a fatty acid or a fatty acid ester;
    the at least three polyether alcohols comprise
        a polyether alcohol having a functionality of 3.5 to 5.5 and a hydroxyl number of 350 to 600 mg KOH/g,
        a three-functional polyether alcohol having a hydroxyl number ranging from 150 to 200 mg KOH/g, and
        a three-functional polyether alcohol having a hydroxyl number ranging from 350 to 420 mg KOH/g;
    the at least three polyether alcohols are independently prepared by addition of ethylene oxide, propylene oxide, or both, onto a H-functional starter substance selected from the group consisting of trimethylolpropane, glycerol, pentaerythritol, a sugar compound, a polyhydric phenol, a resole resin, melamine and mixtures thereof;
    the at least one halogenated alkene is selected from the group consisting of cis-1, 1,1,3-tetrafluoropropene, trans-1,1,1,3-tetrafluoropropene, 1,1,1-trifluoro-2-chloropropene, 1-chloro-3,3,3-trifluoropropene, 1,1,1,2,3-pentafluoropropene, in cis or trans form, 1,1,1,4,4,4-hexafluorobutene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1, 1,3,3-tetrafluoropropene, 2-bromo-3, 3, 3-trifluoropropene, E-1-bromo-3,3,3-trifluoro propene, 3,3,3-trifluoro-2-(trifluoromethyl)propene, 1-chloro-3, 3,3-trifluoropropene, 2-chloro-3,3,3-trifluoropropene, 1,1,1-trifluoro-2-butene and mixtures thereof;
    an amount of the water is at least 1.80 mol/kg, relative to an amount of the polyol component; and
    an amount of the halogenated alkene is at most 2.00 mol/kg, relative to the amount of the polyol component.

2. The process according to claim 1, wherein the polyol component further comprises a further additive selected from the group consisting of an alkylene carbonate, a carbonamide, a pyrrolidone, a catalyst, an auxiliary, and a mixture thereof.

3. The process according to claim 1, wherein the polyol component comprises 2% to 40% by weight of the three-functional polyether alcohols, based on the weight of the polyol component.

4. The process according to claim 1, wherein the polyol component comprises 20% to 55% by weight of the polyether alcohol having a functionality of 3.5 to 5.5, based on the weight of the polyol component.

5. The process according to claim 1, wherein the polyol component comprises a polyol comprising at least two OH groups as the sole reactive groups.

6. The process according to claim 1, wherein the polyol component further comprises a polyester alcohol.

7. The process according to claim 1, wherein the fatty acid or fatty acid ester is selected from the group consisting of castor oil, oleic acid and mixtures thereof.

8. The process according to claim 1, wherein the H-functional starter substance is selected from the group consisting of the trimethylolpropane, the glycerol, the pentaerythritol, glucose, sorbitol, mannitol, sucrose, the polyhydric phenol, the resole resin, and mixtures thereof.

9. The process according to claim 1, wherein the polyol component further comprises at least one of an alkylene carbonate, a foam stabilizer and a catalyst.

10. The process according to claim 1, wherein the polyol component further comprises at least one of an alkylene carbonate and a foam stabilizer.

* * * * *